United States Patent
Nilsson

(10) Patent No.: US 8,448,447 B2
(45) Date of Patent: May 28, 2013

(54) GAS TURBINE ENGINE WITH FUEL BOOSTER

(75) Inventor: Ulf Nilsson, Whetstone (GB)

(73) Assignee: Siemens Aktiengesellschaft, München (DE)

( * ) Notice: Subject to any disclaimer, the term of this patent is extended or adjusted under 35 U.S.C. 154(b) by 768 days.

(21) Appl. No.: 12/532,853

(22) PCT Filed: Mar. 27, 2008

(86) PCT No.: PCT/EP2008/053586
§ 371 (c)(1),
(2), (4) Date: Sep. 24, 2009

(87) PCT Pub. No.: WO2009/089921
PCT Pub. Date: Jul. 23, 2009

(65) Prior Publication Data
US 2010/0107649 A1    May 6, 2010

(30) Foreign Application Priority Data

Mar. 28, 2007    (EP) ..................................... 07006445

(51) Int. Cl.
*F02C 6/08*    (2006.01)
(52) U.S. Cl.
USPC ....................................................... 60/782
(58) Field of Classification Search
USPC ................... 60/39.17, 39.5, 39.52, 728, 736, 60/782, 785, 795, 806, 39.182
See application file for complete search history.

(56) References Cited

U.S. PATENT DOCUMENTS

| 2,970,437 | A | * | 2/1961 | Anderson | 60/785 |
|---|---|---|---|---|---|
| 3,080,716 | A | * | 3/1963 | Cummings et al. | 60/736 |
| 3,161,020 | A | * | 12/1964 | La Haye | 60/772 |
| 3,365,121 | A | * | 1/1968 | Phillips | 417/207 |
| 3,651,645 | A | * | 3/1972 | Grieb | 60/262 |
| 4,434,613 | A | * | 3/1984 | Stahl | 60/784 |
| 5,161,365 | A | * | 11/1992 | Wright | 60/780 |
| 5,219,268 | A | * | 6/1993 | Johnson | 415/115 |
| 5,233,823 | A |   | 8/1993 | Day | |
| 5,255,505 | A | * | 10/1993 | Cloyd et al. | 60/806 |
| 5,313,783 | A | * | 5/1994 | Althaus | 60/39.181 |
| 5,329,757 | A |   | 7/1994 | Faulkner et al. | |
| 5,363,641 | A | * | 11/1994 | Dixon et al. | 60/778 |
| 5,414,992 | A |   | 5/1995 | Glickstein | |

(Continued)

FOREIGN PATENT DOCUMENTS

| DE | 1120821 B | 12/1961 |
|---|---|---|
| EP | 0584958 A1 | 3/1994 |

(Continued)

*Primary Examiner* — Phutthiwat Wongwian

(57) ABSTRACT

A gas turbine engine including a compressor section, a combustor section including a combustor, a turbine section, a gaseous fuel supply conduit with an upstream section and a downstream section, a fuel booster, and a heat exchanger is provided. The fuel booster is located in the gaseous fuel supply conduit. The fuel booster has a driving expander with a driving fluid inlet and a driving fluid outlet for discharging expanded air and a fuel compressor with a low pressure fuel inlet connected to the upstream section of the gaseous fuel supply conduit and a high pressure fuel outlet connected to the downstream section of the gaseous fuel supply conduit. The heat exchanger is located between the driving fluid on the one side and the gaseous fuel on the other side so that a heat transfer between the air and the gaseous fuel is possible.

9 Claims, 6 Drawing Sheets

U.S. PATENT DOCUMENTS

| | | | |
|---|---|---|---|
| 5,899,070 A | 5/1999 | Droessle et al. | |
| 6,415,595 B1* | 7/2002 | Wilmot et al. | 60/785 |
| 6,560,966 B1* | 5/2003 | Fetescu et al. | 60/775 |
| 6,817,187 B2 | 11/2004 | Yu | |
| 7,266,946 B2* | 9/2007 | Fletcher et al. | 60/785 |
| 7,637,093 B2* | 12/2009 | Rao | 60/39.52 |
| 7,810,332 B2* | 10/2010 | Olmes et al. | 60/728 |
| 2004/0045294 A1* | 3/2004 | Kobayashi et al. | 60/728 |
| 2004/0088987 A1 | 5/2004 | Malmrup | |
| 2004/0194627 A1* | 10/2004 | Huang et al. | 96/6 |
| 2005/0166598 A1* | 8/2005 | Spadaccini et al. | 60/782 |
| 2009/0170043 A1* | 7/2009 | Nilsson et al. | 431/246 |

FOREIGN PATENT DOCUMENTS

| | | |
|---|---|---|
| EP | 0915242 A2 | 5/1999 |
| GB | 741433 A | 12/1955 |
| GB | 742270 A | 12/1955 |
| GB | 2191821 A | 12/1987 |
| JP | 2003166428 A | 6/2003 |

* cited by examiner

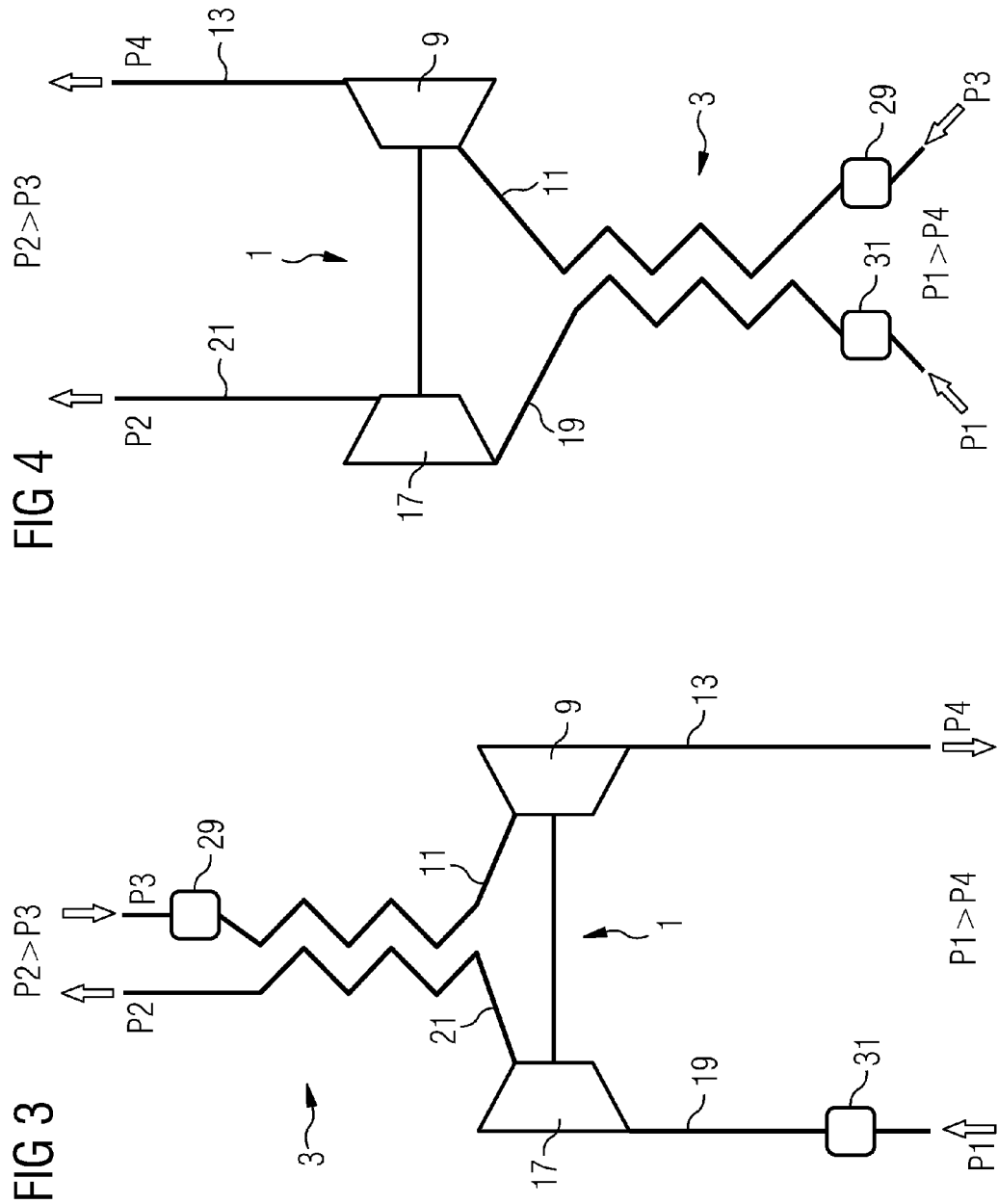

GAS TURBINE ENGINE WITH FUEL BOOSTER

CROSS REFERENCE TO RELATED APPLICATIONS

This application is the US National Stage of International Application No. PCT/EP2008/053586, filed Mar. 27, 2008 and claims the benefit thereof. The International application claims the benefits of European Patent Office application No. 07006445.6 EP filed Mar. 28, 2007, both of the applications are incorporated by reference herein in their entirety.

FIELD OF INVENTION

The present invention relates to a gas turbine engine with a compressor section, a combustor section comprising at least one combustor and a turbine section.

BACKGROUND OF INVENTION

The strive for higher simple cycle efficiency among gas turbine manufacturers has led to higher pressure ratios exceeding the supply pressures of gaseous fuels, e.g. natural gas. To overcome this insufficiency booster compressors for the gaseous fuel are used. Such separate compressors are driven by an electrical motor or by a high pressure fluid bled from the compressor or the turbine stage, as disclosed, e.g., in US 2004/0088987 A1 or U.S. Pat. No. 5,329,757. Similar systems are also known from gaseous fuel engines, as disclosed, e.g. in U.S. Pat. No. 5,899,070. If the compressor is used which is driven by air bled from the compressor or combustion gas bled from the turbine section, the air or gas, respectively, is expanded through a turbine connected to the fuel compressor.

U.S. Pat. No. 5,329,757 further discloses a heat exchanger which is used to cool the compressed gaseous fuel after compression. Furthermore, a second heat exchanger may be present in the duct ducting pressurised gas for driving the turbine connected to the fuel compressor. This heat exchanger is used for heating pressurised driving gas if this is relatively cool, e.g. gas from the compressor section, in order to increase its energy per unit mass. The heat is taken from the exhaust gas of the gas turbine engine.

A heat exchanger for heating fuel before injection into a combustor is disclosed in U.S. Pat. No. 6,817,187 B2.

SUMMARY OF INVENTION

According to this state of the art it is an objective of the present invention to provide an improved gas turbine engine with a fuel booster located in a gaseous fuel supply conduit.

This objective is solved by a gas turbine engine as claimed in the claims. The depending claims define further developments of the invention.

An inventive gas turbine engine comprises a compressor section, a combustor section comprising at least one combustor, a turbine section and at least one gaseous fuel supply conduit with an upstream section and a downstream section, the downstream section being connected to the combustor for delivering gaseous fuel. A fuel booster is located in the gaseous fuel supply conduit which has a driving expander and a fuel compressor. The driving expander comprises a driving fluid inlet for receiving an unexpanded driving fluid and a driving fluid outlet for discharging expanded driving fluid. The fuel compressor comprises a low pressure fuel inlet connected to the upstream section of the gaseous fuel supply conduit and a high pressure fuel outlet connected to the downstream section of the gaseous fuel supply conduit. In the present invention a heat exchanger is present which is located between the unexpanded driving fluid or the expanded driving fluid on the one side and the low pressure gaseous fuel or the high pressure gaseous fuel on the other side in such a way that heat transfer between the driving fluid and the gaseous fuel is possible.

While in the state of the art as described in U.S. Pat. No. 5,329,757, heat is taken away from the gaseous fuel after compression, heat can be transferred between the gaseous fuel and the driving fluid in the present invention. In particular, heat can be transferred from the driving fluid to the gaseous fuel. This offers the possibility to preheat the gaseous fuel and thus to increase the pressure of the gaseous fuel further as compared to a compression only by the fuel compressor.

Transferring surplus heat from the driving fluid to the gaseous fuel also improves the relative efficiency of the gas turbine engine as the heat is brought back into the cycle and can produce work.

There are four basic configurations how the heat exchanger may be located between the driving fluid and the gaseous fuel.

In a first configuration, the heat exchanger is located between the unexpanded driving fluid, on the one hand, and the high pressure gaseous fuel, on the other hand.

In a second configuration, the heat exchanger is located between the unexpanded driving fluid, on the one hand, and the low pressure gaseous fuel, on the other hand.

In a third configuration, the heat exchanger is located between the expanded driving fluid, on the one hand, and the low pressure gaseous fuel, on the other hand.

In a fourth configuration, the heat exchanger is located between the expanded driving fluid, on the one hand, and the high pressure gaseous fuel, on the other hand.

Depending on the scheme which is used for heat transfer, it becomes possible to further raise the pressure in the fuel gas, to choose different sources of driving fluid, to adjust the mechanical loading on the fuel booster by the gaseous fuel (heating before compression decreases density) or optimising between compression work and efficiency (heating before compression increase the volume flow and hence the size of the components used). However, the auto ignition point for the compressed gaseous fuel should be also taken into consideration.

The driving fluid inlet may, in the inventive gas turbine engine in particular be in flow connection with a compressed air outlet of the gas turbine engine's compressor so that compressed air can be used as unexpanded driving fluid. The expanded driving fluid would then be expanded air. In this case, the fuel booster could, e.g. be situated on a bleed chamber which is in flow connection with the compressor flow between the compressor inlet and the compressor outlet. In that case, the driving fluid inlet of the turbocharger would be open towards the interior of the bleed chamber. Alternatively, the bleed chamber could, e.g., be located on and be open to a burner plenum of the gas turbine engine.

Driving the expander with compressed air taken from the compressor offers the possibility for the driving fluid outlet of the expander to be in flow connection with at least one cooling channel which is present in a combustor section and/or in a turbine section. The expanded air could then be used as a cooling fluid for cooling the combustor section and/or the turbine section. In addition, if at least one opening is present connecting the at least one cooling channel to a flow path for hot combustion gas in a combustor or in the turbine section, the expanded air may also be used as sealing air. Connecting the driving fluid outlet with at least one cooling channel which is present in a combustor section is, in particular, suitable for gas turbine engines with a high pressure turbine, a low pressure turbine, a primary combustor and a secondary combustor (or re-heat combustor) which is present between the high pressure turbine and the low pressure turbine and which comprises at least one cooling channel. An according gas turbine engine is, e.g., disclosed in U.S. Pat. No. 6,817, 187 B2, to which it is referred to with respect to the configuration of such an engine. The driving fluid outlet can then be connected to the at least one cooling channel in the secondary combustor.

The expanded air may also be used in an active clearance control system in which air is used for determining the diameter of the turbine casing outside the turbine rotor blades. The driving fluid outlet of the expander is then in flow connection with the active clearance control system. After active clearance control the air may be used further or released to the outside of the gas turbine engine. The active clearance control system may comprise an active clearance control configuration, whereby air is directed to at least one stator part of the turbine stator determining the diameter of the turbine casing outside the turbine rotor blades. The system could be thermal, i.e. the diameter of the turbine casing is varied by heating or cooling the at least one stator part by use of the expanded air, or mechanical, i.e. the diameter of the turbine casing is varied by mechanically acting on the at least one stator part, e.g. by a mechanical device operated or activated by the pressure of the expanded air or the air pressure of the expanded air itself if the pressure is high enough for mechanically acting on the stator part.

Additionally, or alternatively, the expanded air outlet may be in flow connection with the compressor inlet which would, e.g. offer the possibility of using the expanded air as an anti-icing flow in the compressor intake.

A further alternative would be that the driving fluid outlet is in flow connection with components of the gas turbine engine which can be controlled by the use of pressurised air. In this context it should be noted that although expanded, the driving fluid may still have a raised pressure compared to ambient pressure, in particular if compressor air bled from one of the last compressor stages or combustion gas bled from the turbine section is used as a driving medium.

An alternative to using pressurised air or combustion gas as a driving medium is to use steam if a heat recovery steam generator is present with which the driving medium inlet would then be in flow connection. This embodiment can, in particular, advantageously be used in combined cycle engines which combine steam and gas turbine engines.

BRIEF DESCRIPTION OF THE DRAWINGS

Further features, properties and advantages of the present invention will become clear from the following description of embodiments in conjunction with the accompanying drawings.

FIG. 3 shows, in a highly schematic view, a first configuration of a fuel booster and a heat exchanger used for compressing gaseous fuel delivered to the burner of the gas turbine shown in FIG. 1.

FIG. 4 shows a second configuration of the fuel booster and the heat exchanger.

DETAILED DESCRIPTION OF INVENTION

Figure 1:
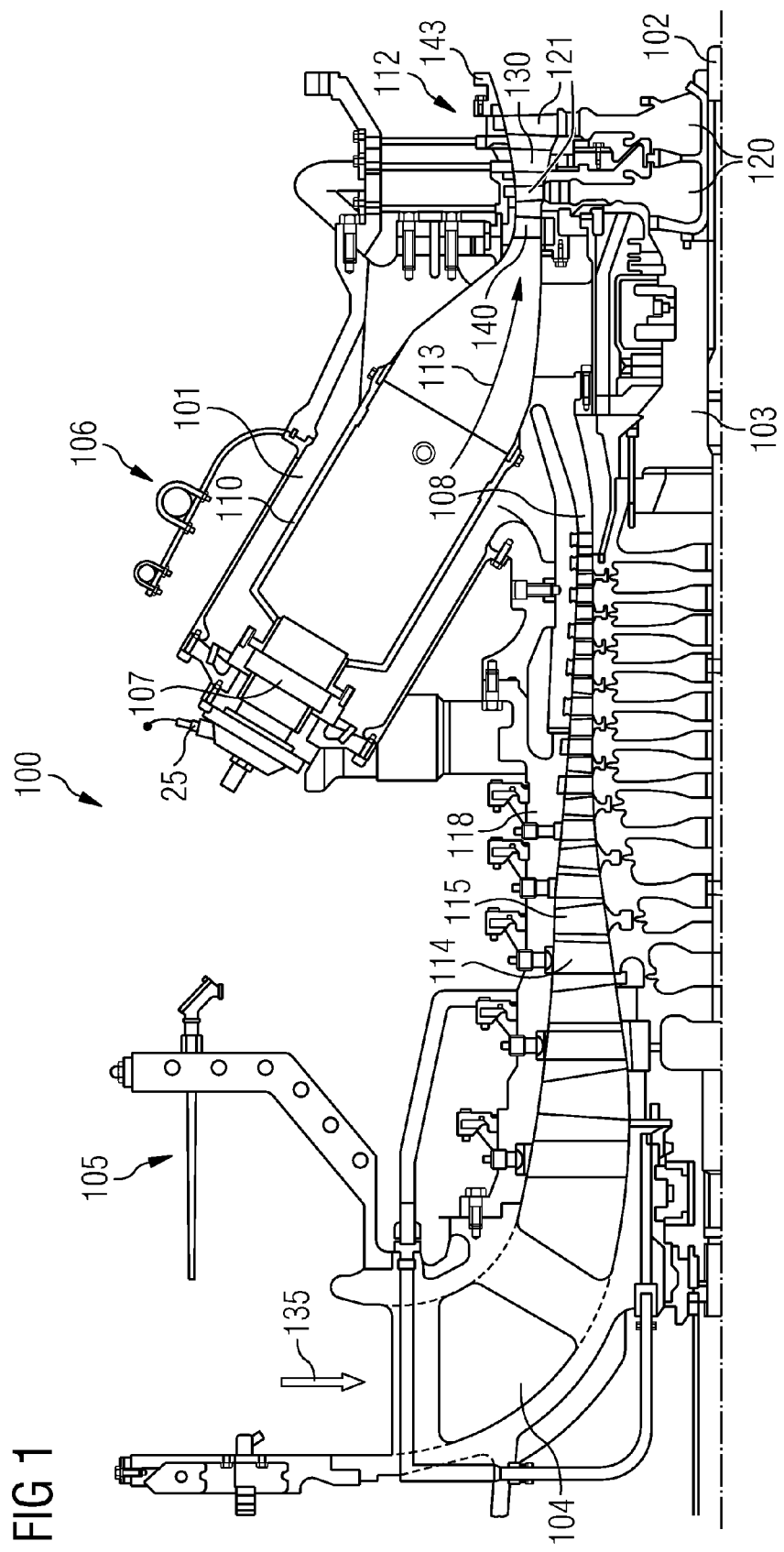
FIG. 1 shows a gas turbine engine in a sectional view.

FIG. 1 shows an example of a gas turbine engine 100 in a sectional view. The gas turbine engine 100 comprises a compressor section 105, a combustor section 106 and a turbine section 112 which are arranged adjacent to each other in the direction of a longitudinal axis 102. It further comprises a rotor 103 which is rotatable about the rotational axis 102 and which extends longitudinally through the gas turbine engine 100.

In operation of the gas turbine engine 100 air 135, which is taken in through an air inlet 104 of the compressor section 105, is compressed by the compressor section and output to the burner section 106. The burner section 106 comprises a burner plenum 101, one or more combustion chambers 110 and at least one burner 107 fixed to each combustion chamber 110. The combustion chambers 110 and sections of the burners 107 are located inside the burner plenum 101. The compressed air from the compressor exit 108 is discharged into the burner plenum 101 from where it enters the burner 107 where it is mixed with a gaseous or liquid fuel. In the present embodiment a gaseous fuel and a liquid fuel, e.g. oil, can be used alternatively. The air/fuel mixture is then burned and the combustion gas 113 from the combustion is led through the combustion chamber 110 to the turbine section 112.

A number of blade carrying discs 120 are fixed to the rotor 103 in the turbine section 112 of the engine. In the present example, two discs 120 carrying turbine blades 121 are present. However, the number of blade carrying discs could be different, i.e. only one disc or more than two discs. In addition, guiding vanes 130, which are fixed to a stator 143 of the gas turbine engine 100, are disposed between the turbine blades 121. Between the exit of the combustion chamber 110 and the leading turbine blades 121 inlet guiding vanes 140 are present.

The combustion gas from the combustion chamber 110 enters the turbine section 112 and, while expanding and cooling when flowing through the turbine section 112, transfers momentum to the turbine blades 121 which results in a rotation of the rotor 103. The guiding vanes 130, 140 serve to optimise the impact of the combustion gas on the turbine blades 121.

Figure 2:
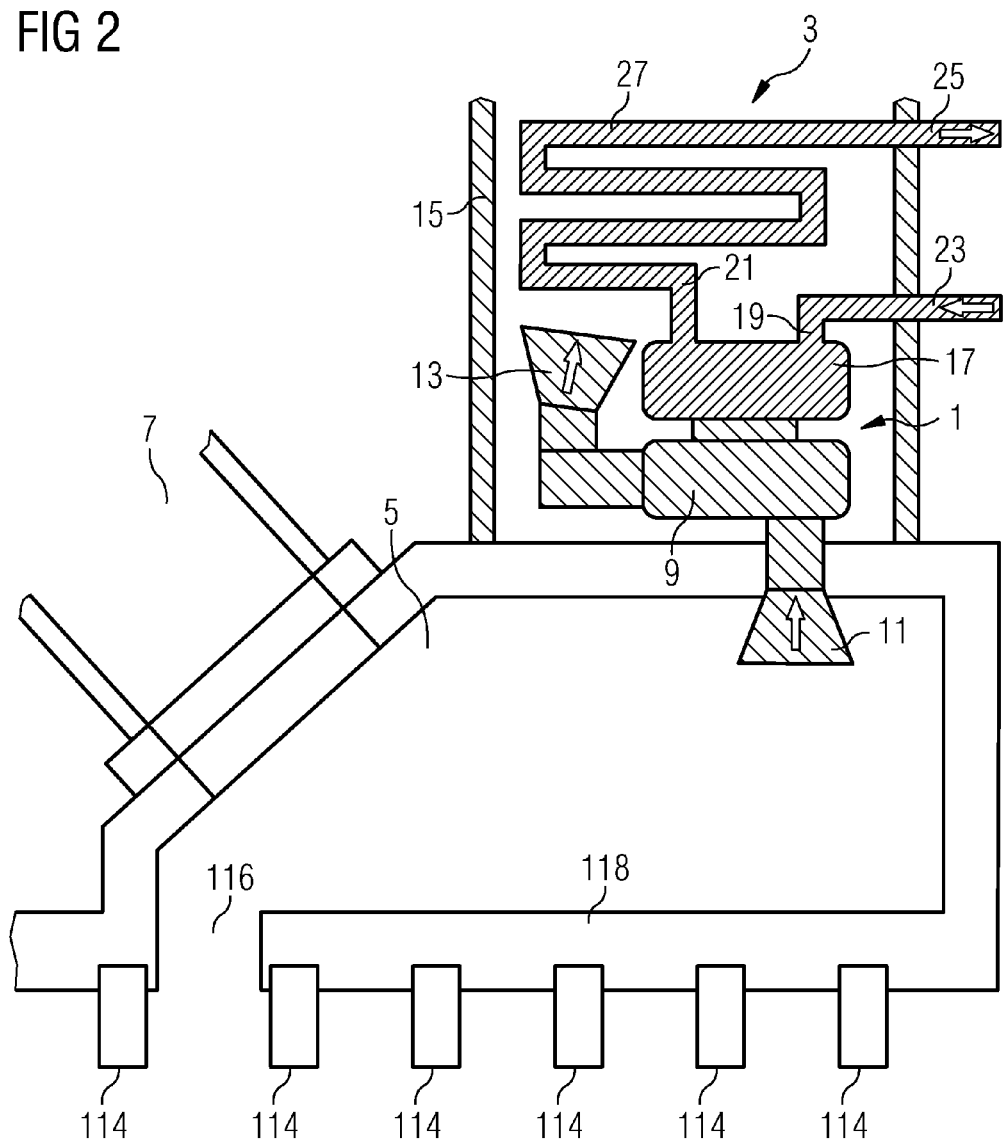
FIG. 2 shows an example as to how to locate a fuel booster and a heat exchanger in the gas turbine engine shown in FIG. 1.

FIG. 2 shows, in a highly schematic view, the location of a fuel booster 1 and a heat exchanger 3 in the gas turbine engine 100 shown in FIG. 1. The gas turbine engine 100 depicted in FIG. 1 comprises a bleed chamber which is located in the compressor section 105. Also visible in FIG. 1 are a number of compressor guide vanes 114 and compressor blades 115 of the compressor. In the more detailed representation of FIG. 2 an opening 116 is present in the wall 118 of the compressor casing so as to establish a flow connection from inside the compressor to the inside of the bleed chamber 5. A bleed duct 7 emanates from the bleed chamber 5 for leading bleed air to the turbine section where it is used as cooling air.

The fuel booster 1 shown in FIG. 2 comprises an expander 9 with an air inlet 11 and an air outlet 13. The air inlet 11 is open towards the bleed chamber so that bleed air can enter the expander 9. The expander is implemented as a turbine which is driven by the bleed air thereby expanding and cooling the bleed air. The expanded and cooled bleed air is discharged through the air outlet 13 into an air duct 15. The air duct 15 may be in flow connection with the turbine section or the combustor so that the cooled and expanded air can be used as cooling air or, depending on its remaining pressure, sealing air, e.g. for vanes in the turbine section or heat shield elements in the combustor, or in a clearance control configuration.

The fuel booster further comprises a fuel compressor 17 with a gaseous fuel inlet 19 that is connected to an upstream section 23 of a gaseous fuel supply line and with a gaseous fuel outlet 21 which is connected to a downstream section 25 of the gaseous fuel supply line. A coiled fuel line section 27 is present between the gaseous fuel outlet 21 and the downstream section 25 of the gaseous fuel supply line such that it is completely located in the air duct 15 into which the expanded and cooled air is discharged by the air outlet 13. Hence, the coiled fuel line section 27 acts as a heat exchanger 3 which allows heat to be exchanged between the expanded air and the gaseous fuel flowing through the coiled fuel line section 27.

Gaseous fuel which enters the fuel compressor 17 through the gaseous fuel inlet 19 is compressed by the fuel compressor 17 which is driven by the expander 9. The compressed gaseous fuel, which is also heated due to the compression, then flows through the gaseous fuel outlet and the coiled fuel line section 27 into the downstream section 25 of the fuel supply line. From there it is delivered to the burner 107.

The expanded air which is discharged from the expander 9 through the air outlet 13 is, although cooled with respect to the compressed air in the bleed chamber, in many cases still warmer than the gaseous fuel after compression so that it can be used to preheat the gaseous fuel flowing through the coiled fuel line section 27. By this measure, the pressure within the gaseous fuel and the cycle efficiency of the gas turbine can be further increased. However, one should take care that the temperature of the gaseous fuel after preheating is sufficiently below the auto ignition temperature of the compressed gaseous fuel in order to prevent ignition of the gaseous fuel within the fuel supply line or in the fuel nozzle of the burner.

The temperature of the expanded air depends on the pressure ratio of the air before expanding to the air after expanding and the air temperature before expanding. Thus, the temperature of the expanded air can be adjusted by locating the opening 116 in a certain compressor stage, which determines the pressure and the temperature of the bleed air in the bleed chamber. The pressure ratio by which the gaseous fuel is compressed depends on the pressure ratio by which the air is expanded and by the gear ratio of a gear which may be present between the expander 9 and the fuel compressor 17.

Although a special configuration of the heat exchanger 3 with respect to the fuel booster 1 is shown in FIG. 2, there are other configuration possibilities. These possibilities are schematically shown in FIGS. 3 to 6.

FIG. 3 shows a first configuration of the fuel booster 1 and the heat exchanger 3 in which the heat exchanger 3 is located between the air flowing into the expander 9 and the compressed gaseous fuel coming out of the fuel compressor 17. As in FIG. 2, the heat exchanger 3 can be realised as a coiled fuel line 27 which is passed by the compressor air before it is taken in into the expander 9. In the embodiment shown in FIG. 2, this configuration could be realised by providing a coiled fuel supply line 27 in the bleed chamber 5 which is connected to the compressed gaseous fuel outlet 21 and the downstream section 25 of the gaseous fuel line.

Also shown in FIGS. 3 to 6 are filters 29, 31 which are located upstream from the air inlet 11 of the expander 9 and the gaseous fuel inlet 19 of the fuel compressor 17 for protecting these components.

A second configuration of the fuel booster 1 and the heat exchanger 3 is shown in FIG. 4. In this configuration, the heat exchanger 3 is located between the air taken into the expander 9 and the gaseous fuel taken into the fuel compressor 17. Hence, in this configuration, the gaseous fuel is preheated before entering the fuel compressor 17 rather than after leaving the compressor. Preheating before entering the fuel compressor 17 would decrease the density of the gaseous fuel and thus increase the volume flow through the fuel compressor 17. However, if the same mass flow, which is reciprocal to the volume flow, shall be achieved as with preheating after compression, the size of the fuel compressor 17 needs to be larger that in the case of preheating after compression. Therefore, if space for installing the fuel booster is limited, preheating after compression would be more desirable. If, on the other hand, the mass flow through the fuel compressor 17 shall be kept low, e.g. to reduce the loads acting on the components, a preheating before compression would be more desirable.

The configuration shown in FIG. 4 could be implemented in the embodiment shown in FIG. 2 by locating the coiled fuel line section 27 in the bleed chamber 5 and connecting the coiled fuel line section 27 to the upstream section 23 of the fuel supply line, on the one hand, and the gaseous fuel inlet 19 of the compressor 17, on the other hand.

Figure 5:
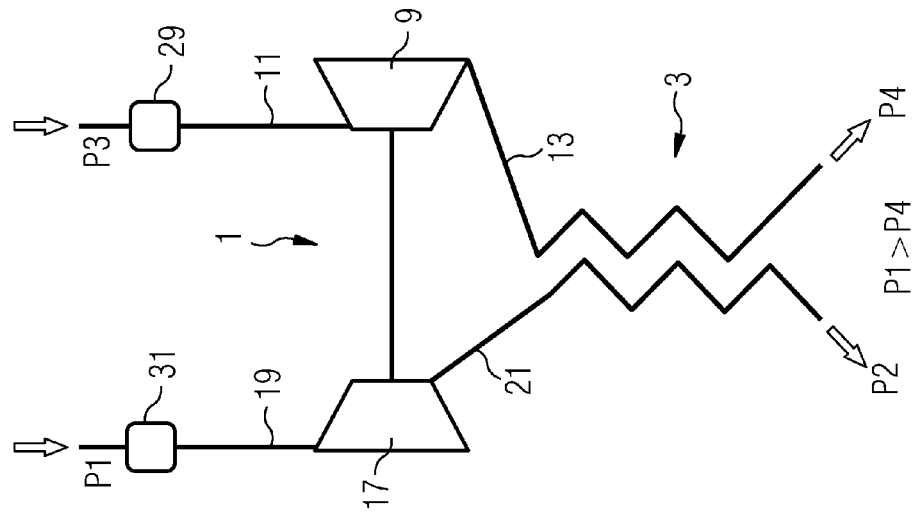
FIG. 5 shows a third configuration of the fuel booster and the heat exchanger.

A third configuration of the fuel booster 1 and the heat exchanger 3 is shown in FIG. 5. In this configuration, the heat exchanger 3 is placed between the expanded air and the gaseous fuel before it enters the fuel compressor 17. As in the configuration shown in FIG. 4, the gaseous fuel is preheated before compression. However, compared to the configuration in FIG. 4, the heat transfer through the gaseous fuel is reduced as the expanded air leaving the expander 9 is of lower temperature then the bleed air that enters the expander 9.

The configuration schematically shown in FIG. 5 can be implemented in the embodiment shown in FIG. 2 by locating the coiled gaseous fuel line section 27 within the air duct 15, as it is shown in FIG. 2, but connecting the coiled fuel line section 27 to the upstream section 23 of the gaseous fuel line, on the one hand, and the gaseous fuel inlet 19, on the other hand, rather than between the gaseous fuel outlet 21 and the downstream section 25 of the gaseous fuel line.

Figure 6:
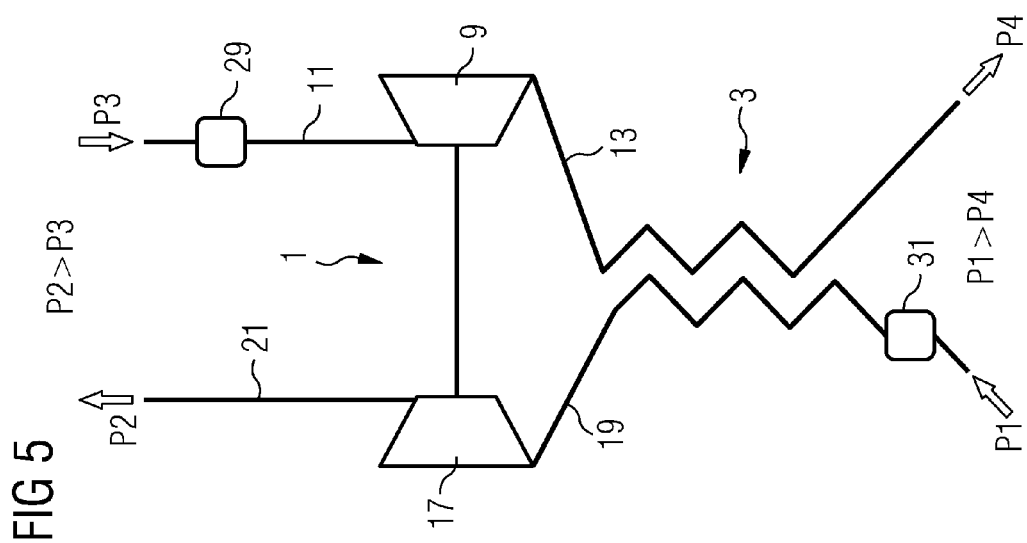
FIG. 6 shows a fourth configuration of the fuel booster and the heat exchanger.

A fourth configuration for the fuel booster 1 and the heat exchanger 27 is shown in FIG. 6. The configuration in this figure is implemented in the embodiment shown in FIG. 2, i.e. the heat exchanger 3 is located between the expanded air and the gaseous fuel before it is taken into the compressor. Hence, the gaseous fuel is preheated after compression, as in the configuration shown in FIG. 3.

By suitably choosing the configuration of the fuel booster 1 and the heat exchanger 3 one can achieve an optimisation between compression work, which is done in the fuel compressor 17, the efficiency of the compression and the load acting on the fuel compressor 17.

In all configurations the air may be used after passing through the expander 9 depending on the remaining pressure and temperature as seal air in bearings, e.g. in the turbine section, or for active clearance control (cooling) of turbine stators. It may also be used to cool certain components in the turbine or it may also simply be released in the exhaust channel downstream of the turbine. A further alternative is to lead the expanded air to the compressor intake where it can be used as an anti-icing flow.

Figure 7:
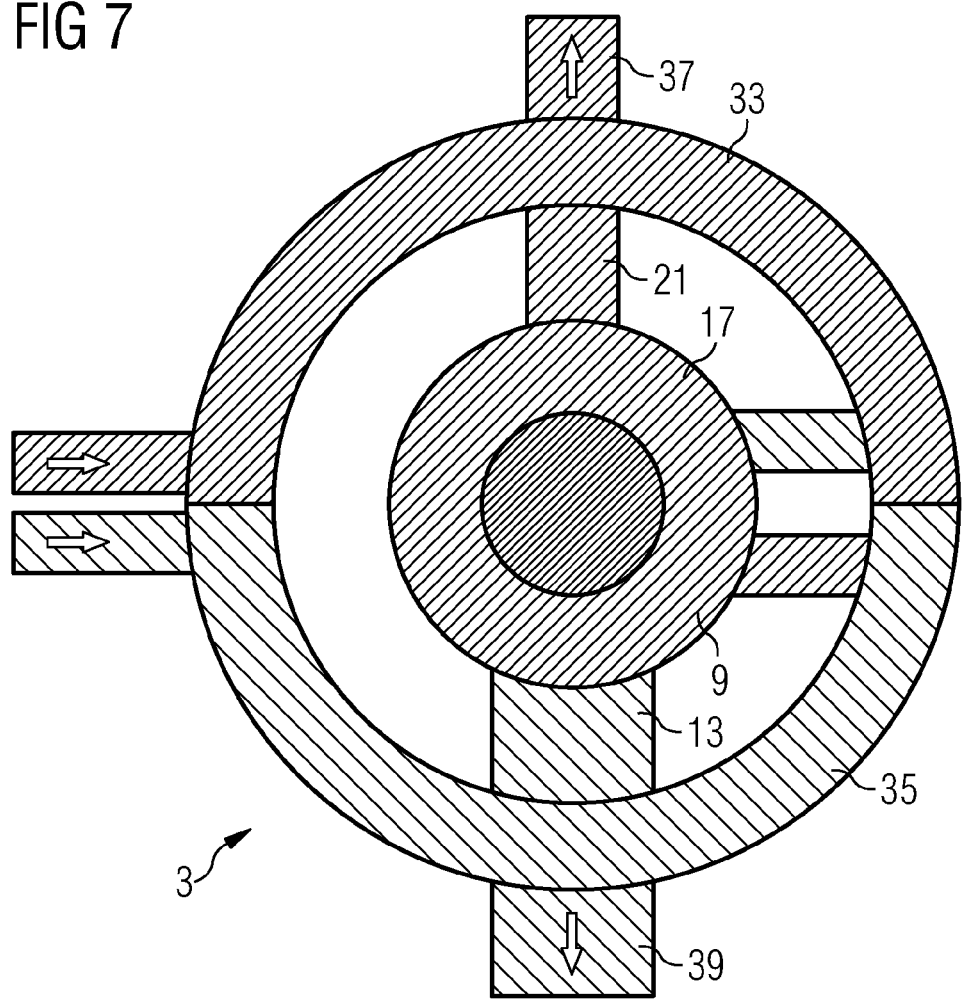
FIG. 7 shows a special design of the heat exchanger.

A configuration of the heat exchanger 3, which is particularly advantageous if there is only limited space available for locating the heat exchanger 3, is shown in FIG. 7. In this configuration, the fuel intake 33 into the fuel compressor 17 and the air intake 35 into the expander 9 are implemented as coils the windings of which are attached to each other for transferring heat. The coils may either be spirally wound or, as shown in FIG. 7, helically. The fuel compressor 17 and the expander 9 are located in the centre of the coils. While the spirally wound coils are desirable if the whole arrangement shall be rather flat, the helically wound coils are desirable if the radial extension of the arrangement shall be small. In both cases linear ducts 37, 39 are employed as the gaseous fuel outlet 21 of the fuel compressor 17 and air outlet 13 of the expander 9.

Figure 8:
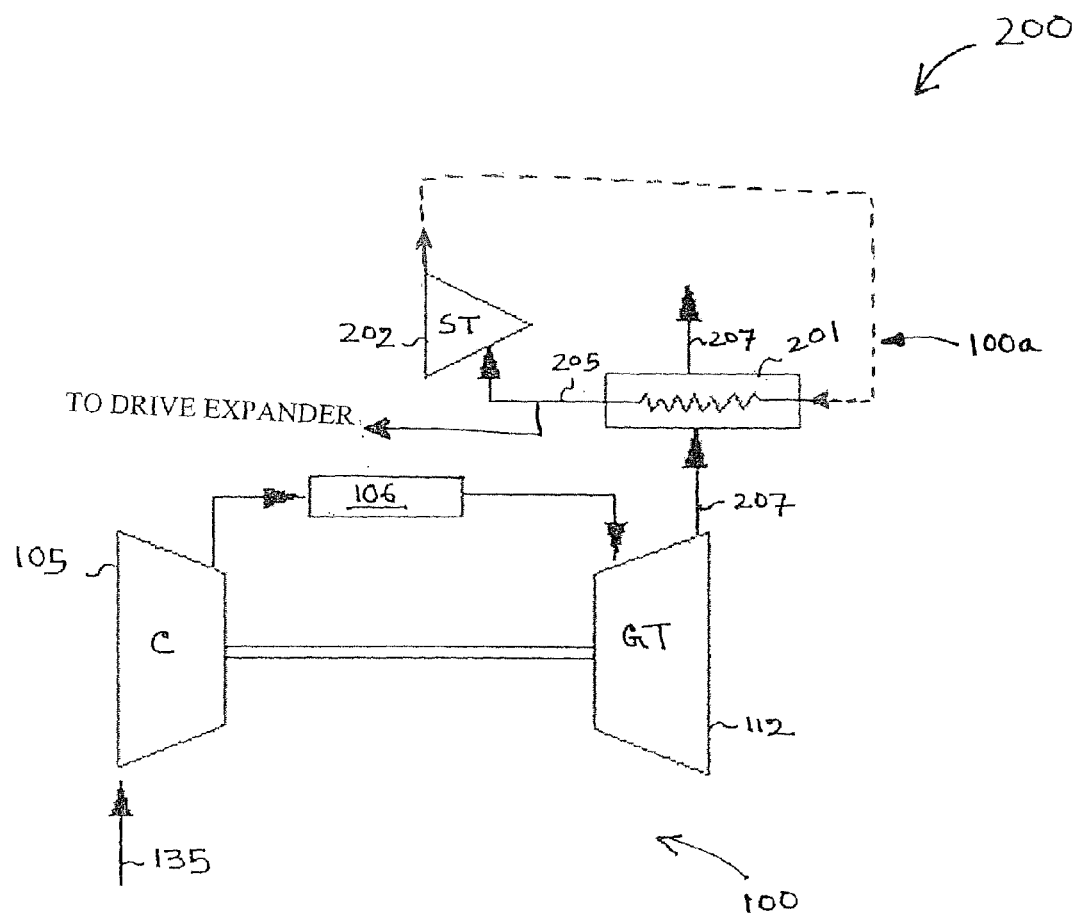
FIG. 8 is a schematic illustration of an embodiment of a combined cycle engine.

FIG. 8 is a schematic illustration of a further embodiment involving a combined cycle engine 200. the combined cycle engine includes a gas turbine engine 100 such as one illustrated above, and a steam turbine engine 100a. For ease of understanding, like numerals represent like elements across all figures, and further explanation has not been provided for elements of the gas turbine engine 100 which have already been described above. The steam turbine engine 100a could be a known type of steam turbine engine, including a heat recovery steam generator 201, which utilizes the exhaust 207 from the gas turbine section 112 to generate steam 205, which may be expanded in a steam turbine 202 for power generation via a Rankine cycle, not explained in any further detail here. In accordance with the illustrated embodiment, a portion of the unexpanded steam 205 from the heat recovery steam generator 201 is flow connected to the drive fluid inlet 11 (see FIG. 2) of the fuel booster of the gas turbine engine, where it is expanded by the drive expander 9. In this embodiment, the heat exchanger is configured to effect heat transfer between the steam (prior to or after expansion by the expander) and the gaseous fuel (prior to or after compression by the fuel compressor 17).

The invention claimed is:
1. A gas turbine engine, comprising:
a compressor section;
a combustor section including a combustor;
a turbine section;
a gaseous fuel supply conduit with an upstream section and a downstream section;
a fuel booster located in the gaseous fuel supply conduit, the fuel booster comprising:
  a driving expander with a driving fluid inlet and a driving fluid outlet, and
  a fuel compressor including a fuel inlet, the fuel inlet being connected to the upstream section, the fuel compressor also including a fuel outlet, the fuel outlet being connected to the downstream section; and
a heat exchanger,
wherein the downstream section is connected to the combustor for delivering a gaseous fuel to the combustor,
wherein the driving fluid inlet is in flow connection with a compressed air outlet of the compressor section, from which the driving fluid inlet receives compressor air, such that a driving fluid of the expander includes the compressor air received from the compressor section,
wherein the heat exchanger is located between the driving fluid on one side and the gaseous fuel on the other side such that a heat transfer takes place between the driving fluid and the gaseous fuel,
wherein the fuel booster is located on a bleed chamber, and
wherein the bleed chamber is in flow connection with the compressor flow between a compressor inlet and the compressor air outlet.

2. The gas turbine engine as claimed in claim 1, wherein the heat exchanger is located between the driving fluid upstream of the driving fluid inlet of the expander and the gaseous fuel flowing out of the fuel outlet of the fuel compressor.

3. The gas turbine engine as claimed in claim 1, wherein the heat exchanger is located between the driving fluid upstream of the driving fluid inlet of the expander and the gaseous fuel upstream of the fuel inlet of the fuel compressor.

4. The gas turbine engine as claimed in claim 1, wherein the heat exchanger is located between the driving fluid flowing out of the driving fluid outlet of the expander and the gaseous fuel upstream of the fuel inlet of the fuel compressor.

5. The gas turbine engine as claimed in claim 1, wherein the heat exchanger is located between the driving fluid flowing out of the driving fluid outlet of the expander and the gaseous fuel flowing out of the fuel outlet of the fuel compressor.

6. The gas turbine engine as claimed in claim 1,
wherein a cooling channel is located in the combustor section or in the turbine section, and
wherein the driving fluid outlet is in flow connection with the cooling channel.

7. The gas turbine engine as claimed in claim 6, wherein an opening connects the cooling channel to a flow path for hot combustion gas in the combustor or the turbine section.

8. The gas turbine engine as claimed in claim 1, wherein the driving fluid outlet is in flow connection with the compressor inlet.

9. A combined cycle engine, comprising:
a compressor section;
a combustor section including a combustor;
a gas turbine section;
a gaseous fuel supply conduit with an upstream section and a downstream section;
a fuel booster located in the gaseous fuel supply conduit, the fuel booster comprising:
  a driving expander with a driving fluid inlet and a driving fluid outlet, and
  a fuel compressor including a fuel inlet and a fuel outlet;
a heat exchanger,
wherein the downstream section is connected to the combustor for delivers a gaseous fuel,
wherein the driving fluid inlet is in flow connection with a heat recovery steam generator which receives unexpanded steam,
wherein the driving fluid outlet discharges expanded steam,
wherein the fuel inlet is connected to the upstream section of the gaseous fuel supply conduit,
wherein the fuel outlet is connected to the downstream section of the gaseous fuel supply conduit, and
wherein the heat exchanger is located between the unexpanded steam or the expanded steam on one side and the gaseous fuel on the other side, such that a heat transfer takes place between the steam and the gaseous fuel.

* * * * *